United States Patent
Fan et al.

(10) Patent No.: US 9,900,834 B2
(45) Date of Patent: Feb. 20, 2018

(54) METHODS AND DEVICES FOR CELL SELECTION

(71) Applicant: Telefonaktiebolaget L M Ericsson (publ), Stockholm (SE)

(72) Inventors: Rui Fan, Beijing (CN); Gen Li, Beijing (CN)

(73) Assignee: Telefonaktiebolaget L M Ericsson (publ) (SE)

( * ) Notice: Subject to any disclaimer, the term of this patent is extended or adjusted under 35 U.S.C. 154(b) by 0 days.

(21) Appl. No.: 14/906,612

(22) PCT Filed: Jul. 24, 2013

(86) PCT No.: PCT/CN2013/079962
§ 371 (c)(1),
(2) Date: Jan. 21, 2016

(87) PCT Pub. No.: WO2015/010267
PCT Pub. Date: Jan. 29, 2015

(65) Prior Publication Data
US 2016/0183179 A1    Jun. 23, 2016

(51) Int. Cl.
*H04W 4/00* (2009.01)
*H04W 48/18* (2009.01)
*H04W 48/12* (2009.01)
*H04W 48/08* (2009.01)
*H04W 84/04* (2009.01)

(52) U.S. Cl.
CPC ........... *H04W 48/18* (2013.01); *H04W 48/08* (2013.01); *H04W 48/12* (2013.01); *H04W 4/00* (2013.01); *H04W 84/042* (2013.01)

(58) Field of Classification Search
CPC ..... H04W 48/18; H04W 48/08; H04W 48/12; H04W 84/042; H04W 4/00
USPC ........................... 455/434, 435.2, 435.3, 437
See application file for complete search history.

(56) References Cited

U.S. PATENT DOCUMENTS

| | | | |
|---|---|---|---|
| 2006/0166694 A1* | 7/2006 | Jeong | H04W 48/16 455/525 |
| 2009/0088160 A1* | 4/2009 | Pani | H04W 36/30 455/436 |
| 2009/0238114 A1* | 9/2009 | Deshpande | H04J 11/0069 370/328 |

(Continued)

FOREIGN PATENT DOCUMENTS

| | | |
|---|---|---|
| CN | 101442789 A | 5/2009 |
| CN | 101646226 A | 2/2010 |

(Continued)

OTHER PUBLICATIONS

Google translation of Patent CN 102026328 A (Xiao et al.) "Method, device and system for sharing network" 7 pages.*

(Continued)

*Primary Examiner* — Mong-Thuy Tran
(74) *Attorney, Agent, or Firm* — Murphy, Bilak & Homiller, PLLC (57) ABSTRACT

Described are, among other things, methods and devices for cell selection or cell reselection in a UE, where the UE can connect to multiple radio access networks. The UE can receive a message indicating the priority of the Public Land Mobile Network that the UE belong to and performing cell selection/cell reselection based on the message.

16 Claims, 4 Drawing Sheets

(56) References Cited

U.S. PATENT DOCUMENTS

| | | | |
|---|---|---|---|
| 2010/0195643 A1* | 8/2010 | Kodali | H04W 48/18 370/352 |
| 2010/0216469 A1 | 8/2010 | Yi et al. | |
| 2010/0222055 A1* | 9/2010 | Cho | H04J 11/0086 455/434 |
| 2010/0240367 A1* | 9/2010 | Lee | H04W 36/0077 455/435.2 |
| 2010/0261474 A1* | 10/2010 | Gollapudi | H04W 48/18 455/435.3 |
| 2010/0273485 A1 | 10/2010 | Huang et al. | |
| 2011/0122783 A1* | 5/2011 | Lin | H04W 76/046 370/252 |
| 2011/0170481 A1* | 7/2011 | Gomes | H04W 36/0083 370/328 |
| 2012/0044910 A1* | 2/2012 | Maeda | H04L 5/0005 370/332 |
| 2012/0238283 A1* | 9/2012 | Tian | H04W 72/10 455/452.1 |
| 2013/0235785 A1* | 9/2013 | Sebire | H04W 48/10 370/312 |
| 2014/0004862 A1* | 1/2014 | Ekemark | H04W 72/06 455/443 |
| 2014/0092785 A1* | 4/2014 | Song | H04L 1/00 370/280 |
| 2014/0307550 A1* | 10/2014 | Forssell | H04W 36/22 370/235 |
| 2014/0321374 A1* | 10/2014 | Kim | H04L 5/0073 370/329 |

FOREIGN PATENT DOCUMENTS

| | | |
|---|---|---|
| CN | 102026328 A | 4/2011 |
| EP | 2190249 A2 | 5/2010 |
| WO | 2012125103 A1 | 9/2012 |

OTHER PUBLICATIONS

3GPP, "3rd Generation Partnership Project; Technical Specification Group Core Network and Terminals; Non-Access-Stratum (NAS) functions related to Mobile Station (MS) in idle mode (Release 10)", 3GPP TS 23.122 V10.5.0, Sep. 2011, 1-44.

3GPP, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.6.0, Jun. 2012, 1-33.

3GPP, "3rd Generation Partnership Project; Technical Specification Group Services and System Aspects; Network Sharing; Architecture and functional description (Release 10)", 3GPP TS 23.251 V10.5.0, Dec. 2012, 1-27.

Peha, Jon et al., "The Public Safety Nationwide Interoperable Broadband Network: A New Model for Capacity, Performance and Cost", FCC White Paper, Jun. 2010, 1-37.

Unknown, Author, "Larry Strickling Cites Public Safety FirstNet as New, Post-Stimulus Broadband Opportunity", Broadband Breakfast.com Staff, BroadbandBreakfast.com, May 25, 2012, 1-2.

Unknown Author, "UE specific intra E-UTRAN (inter-frequency) and inter-RAT cell reselection", 3GPP TSG-RAN2 Meeting #58bis Tdoc R2-072757 Jun. 25-29, 2007 Orlando, USA, Jun. 25-29, 2007, 1-5.

3GPP, "3GPP TS 23.251 V11.0.0", 3rd Generation Partnership Project; Technical Specification Group Services and System Aspects; Network Sharing; Architecture and functional description (Release 11), Sep. 1-28, 2011.

\* cited by examiner

METHODS AND DEVICES FOR CELL SELECTION

TECHNICAL FIELD

The present disclosure relates to methods and devices for cell selection or cell re-selection. In particular the disclosure relates to methods and devices for cell selection or cell re-selection in a shared radio access network (RAN).

BACKGROUND

Cellular radio networks are constantly evolving. The third generation partnership project (3GPP) is an organization setting standards for mobile communication. The standards are structured as releases. New functionality is entered into the standard as new releases are launched.

Third Generation Partnership Project (3GPP) network sharing architecture allows different core network operators to connect to a shared radio access network. In accordance with one supported architecture a radio access network (RAN) is shared and is referred as the Multi-Operator Core Network (MOCN) configuration.

Figure 1:
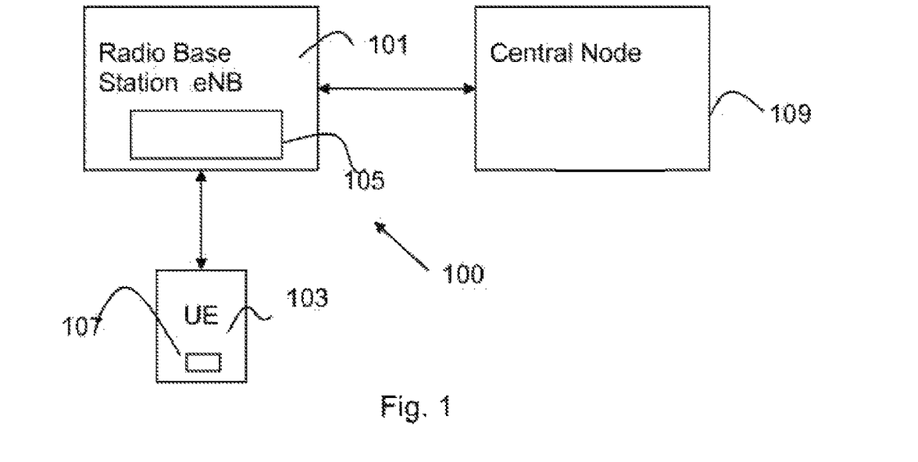
FIG. 1 illustrates a cellular radio system.

As shown in FIG. 1, the architecture for Multiple Operator Core Network (MOCN) allow different core network operators to connect to a shared radio access network (RAN), see 3GPP Technical Specification TS 23.251 V10.5.0, "Network Sharing Architecture and functional description", Technical specification group services and system aspects, December 2012. The operators do not only share the radio network elements, but also share the radio resource themselves. Each cell in shared RAN shall broadcast multiple Public Land Mobile Network (PLMN)-identities corresponding to multiple operators in system information. A User Equipment UE from any of a number of Operators such as Operator A, B or C can decode the broadcast system information and know that this is a cell that it can camp on. In accordance with this information the UE performs the cell (re)selection procedures in a conventional manner.

Public Land Mobile Network (PLMN)

Each public land mobile network (PLMN) operated by one particular operator is identified by a "PLMN identity". For ease of understanding one can consider each PLMN identity as one operator in a simplified model. One or more PLMN identities shall be broadcasted in the system information, see 3GPP TS 36.304 V10.6.0, "User Equipment (UE) procedure in idle mode", Technical specification group radio access network, June 2012.

It is very possible that one operator has dedicated RAN in which only its own PLMN identity is broadcast, and shared RAN in which its PLMN identity is broadcast along with other operator's PLMN identities. Each found PLMN shall be reported to the Non Access Stratum (NAS) for PLMN selection, see details in 3GPP TS23.122 V10.5.0, "Non-Access-Stratum (NAS) functions related to Mobile Station in idle mode", September 2011.

Cell Selection/Reselection

The cell selection and reselection procedure is used so that a UE can camp on a cell. The detailed procedure is described in 3GPP TS 36.304 V10.6.0, "User Equipment (UE) procedure in idle mode", Technical specification group radio access network, June 2012.

Random Access

When a UE camps on one cell in a RRC_IDLE state, random access is used for initial access when establishing a radio link, thereby switching from RRC_IDLE state to RRC_Connected state. The switch is triggered by any of the two following reasons:

Mobile originating: UE has originate services (delay-sensitive or delay-tolerant) for transmission to base station;

Mobile terminating: UE receives the paging information from base station.

During the process of random access, the UE is attempting to access the camped cell whatever the type of access attempt is.

There is a constant desire to improve existing systems and to provide more efficient radio systems.

SUMMARY

It is an object of the present invention to provide an improved method and apparatus for improving the performance in a cellular radio network.

This object and others are obtained by the method and apparatus as set out in the appended claims.

As has been realized by the inventors, due to some requirements operators have different priority in the shared RAN, e.g. a public safety network having a higher priority than a commercial network. Thus when the shared network encounters congestion, UE from public safety network need be treated with higher priority.

Thus, as has been realized by the inventors, a problem with existing solution is that the UEs from different operators are treated differently in shared RAN according to their different priorities. However, UEs do not know the priority it is given in the shared network through the current broadcasted system information. As a result the UE from operators with lower priority will camp on shared RAN instead of dedicated RAN when radio quality in the former is better than the latter. The Quality of Service (QoS) of the delay-sensitive service initiated by those UE can then not be guaranteed as those UE will quite probably be blocked by the network when the load in the shared RAN is high.

The priority here cannot solve the problem mentioned above. This is because the priority here is bundled with a frequency, i.e. the priority applies to all PLMN sharing same cell. What is needed is therefore a method with different priorities applied to different PLMN sharing same cell.

In accordance with some embodiments a radio base station, eNB, broadcast the PLMN list along with its priority index so that UE will know its selected PLMN priority in the shared RAN. The UEs can for example be classified into two classes: delay-tolerant UE (no delay-sensitive services, e.g. machine type communication device) and delay-sensitive UE (support at least one kind of delay-sensitive service). Then during cell selection or reselection procedure, the delay-sensitive UE class should not select the shared RAN in which the PLMN this UE belongs to has lower priority even the RSRP/RSRQ of shared RAN is better unless there is no other cell to camp on. Also when a delay-sensitive UE want to access the network to transmit a delay-tolerant service, it can reselect to the shared RAN cell to initiate the network attachment procedure as long as the RSRP/RSRQ of shared RAN cell is better than dedicated RAN to offload the traffic from its own network.

Thus, a method of cell selection or cell reselection in a User Equipment (UE) is provided. The UE is connectable to multiple radio access networks. The UE receives from a first cell of one of the radio access networks a message indicating the priority of the Public Land Mobile Network that the UE belong to in the first cell, and performs cell selection/cell reselection based on the received message. The first cell can belong to a shared network. The message can be a System Information Block (SIB) message.

In accordance with some embodiments the UE can also connect to a second cell in a second radio access network, wherein said second cell is a dedicated cell operated by the operator of the UE.

In accordance with some embodiments the UE selects the cell where the Public Land Mobile Network that the UE belong to has the highest priority.

In accordance with some embodiments the UE assumes that the Public Land Mobile Network that the UE belong to has a highest priority in a dedicated cell.

In accordance with some embodiments the UE selects the cell with the best radio quality if there are two or more cells where the Public Land Mobile Network that the UE belong to has the same highest priority.

In accordance with some embodiments, when the UE is a delay sensitive UE, the UE camps on a dedicated cell as long as it can connect to a dedicated cell. The UE can be allowed to camp on a cell of a shared network if the UE is to initiate delay tolerant service.

In accordance with another aspect a method performed in a radio base station of a shared radio network is provided. The radio base station transmits a message indicating the priority of the Public Land Mobile Network that a UE within a coverage area of the radio base station belong to. The message can be a System Information Block (SIB) message.

The disclosure also extends to devices and in particular to a radio base station and to a UE for use in a cellular radio system that are adapted to perform the methods as described herein. The devices can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

In FIG. 1 a general view of a Radio Access Network (RAN) cellular radio system 100 is depicted. The system can for example be a Long Term Evolution (LTE) system. The RAN can for example be a shared RAN where different core network operators can to connect to a shared radio access network (RAN), The system 100 comprises a number of radio base stations 101, here denoted eNBs, whereof only one is shown in the simplified view in FIG. 1. The radio base stations 101 are connected to a control node 109. The system 100 may of course comprise multiple central nodes 109.

Mobile stations 103, here represented by a single unit and denoted User Equipment (UE), that are present in a geographical area covered by radio base station(s) can connect to the radio base station over a radio interface. The radio base station 101 further comprises a module 105 for performing different operations of the radio base station 101. The module 105 can for example be implemented using a microcontroller operating on a set of computer software instructions stored on a memory in the module 105. The UEs 103 in turn comprises a module 107 adapted to perform operations of the UEs 103. The module 107 can for example be implemented using a microcontroller operating on a set of computer software instructions stored on a memory in the module 107. The radio base stations supports transmission to and from all the UEs in the area that they cover.

As set out above, a problem with existing solution is that UEs using different operators are treated differently in a shared RAN according to their different priorities. However, the UEs do not know the priorities it is given in the shared network through the current broadcasted system information.

As a consequence UEs from operators with lower priority will camp on shared RAN instead of dedicated RAN when radio quality in the former is better than the latter. The result can be that QoS of a delay-sensitive service initiated by such a UE cannot be guaranteed. This is because a UE with low priority in a shared RAN will have a high probability to be blocked by the network when the load in the shared RAN is high.

To solve the problem mentioned above, the radio base station eNB can be configured to broadcast the PLMN list along with its priority index so that UE will know its selected PLMN priority in the shared RAN.

Figure 2:
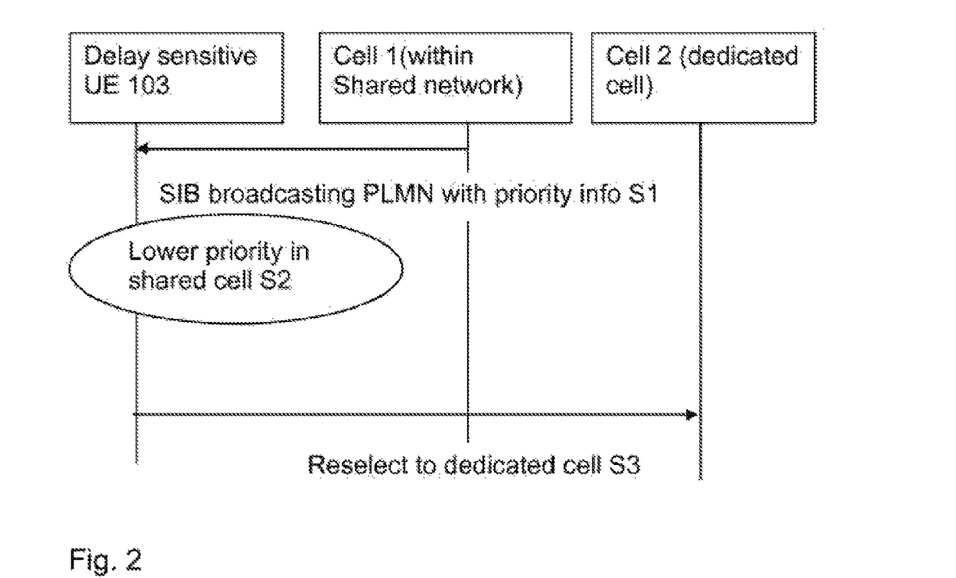
FIG. 2 is a signaling diagram illustrating a first scenario.

During cell selection or reselection procedure, the UE should not select the shared RAN in which the PLMN this UE belongs to has lower priority even the radio quality such as for example given by Reference Signal Received Power/Reference Signal Received Quality (RSRP/RSRQ) of shared RAN is better unless there is no other cell to camp on. This is illustrated in FIG. 2. Thus, In FIG. 2 a UE 103 can connect to a first cell Cell1 which is within a shared RAN and also to a second cell Cell2 which is a dedicated cell. Then, first in a step S1 the first cell transmits a broadcast message informing the UE of its priority within the shared network cell, Cell1, i.e. a message indicating the priority of the Public Land Mobile Network that the UE belong to in the first cell. Next, in a step S2, the UE determines if it has a lower priority in the cell Cell1 of the shared network than in the dedicated cell Cell2 of a dedicated network. The UE can assume that it will have the highest priority in the dedicated cell Cell2. If the priority is lower in the shared network cell Cell1, the UE reselects cell to the dedicated cell Cell2 in a step S3.

Figure 3:
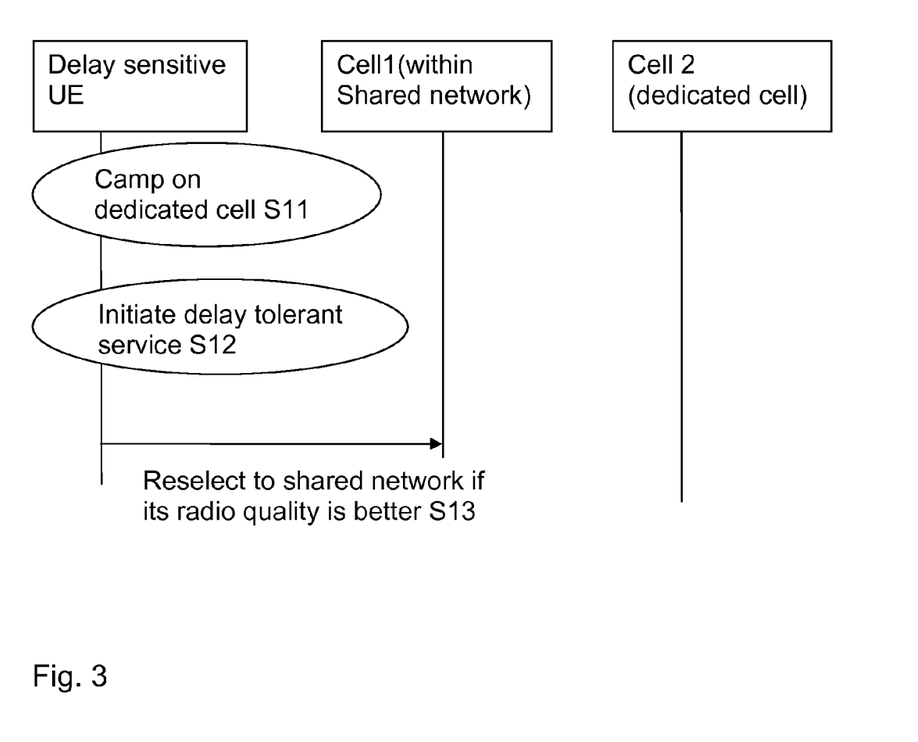
FIG. 3 is a signaling diagram illustrating a second scenario.

In accordance with one embodiment, when a UE wants to access the network to transmit a delay-tolerant service, it can reselect to the shared RAN cell to initiate the network attachment procedure as long as the RSRP/RSRQ of shared RAN cell is better than dedicated RAN to offload the traffic from its own network. This is illustrated in FIG. 3. First in a step S11 the UE is camping on a dedicated cell. Next, in a step S12 the UE initiates a delay-tolerant transmission. Thereupon, in a step S13 the UE reselects cell to the cell with the best radio quality. Thus, the UE can in step S13 reselect to a shared network cell Cell1 if that cell has a better radio quality for the transmission of the delay tolerant transmission even if the priority in Cell1 is lower than in the dedicated cell Cell2. If on the other hand a delay sensitive transmission is initiated, the UE will reselect again and select the cell were the UE has the best priority.

Further, the UEs can be classified into two classes: delay-tolerant UE, no delay-sensitive services, e.g. machine type communication device, and delay-sensitive UE support at least one kind of delay-sensitive service such as speech. In accordance with some embodiments only a delay sensitive UE is configured to operate in accordance with the procedures described above in conjunction with FIGS. 2 and 3. In other words a delay-tolerant UE will always select the RAN with the best radio quality such as RSRP/RSRQ regardless if it is a shared RAN or not.

Currently, the PLMN information broadcasted as follows in System Information Block (SIB) 1

Priority Information of PLMN in SIB1

```
SystemInformationBlockType1 ::=   SEQUENCE {
    cellAccessRelatedInfo            SEQUENCE {
        plmn-IdentityList                PLMN-IdentityList,
        trackingAreaCode                 TrackingAreaCode,
        cellIdentity                     CellIdentity,
        cellBarred                       ENUMERATED {barred, notBarred},
        intraFreqReselection             ENUMERATED {allowed, notAllowed},
        csg-Indication                   BOOLEAN,
        csg-Identity                     CSG-Identity            OPTIONAL    -- Need OR
    },
    cellSelectionInfo                SEQUENCE {
        q-RxLevMin                       Q-RxLevMin,
        q-RxLevMinOffset                 INTEGER (1..8)          OPTIONAL    -- Need OP
    },
    p-Max                            P-Max                       OPTIONAL,   -- Need OP
    freqBandIndicator                INTEGER (1..64),
    schedulingInfoList               SchedulingInfoList,
    tdd-Config                       TDD-Config                  OPTIONAL,   -- Cond TDD
    si-WindowLength                  ENUMERATED {
                                         ms1, ms2, ms5, ms10, ms15, ms20,
                                         ms40},
    systemInfoValueTag               INTEGER (0..31),
    nonCriticalExtension             SystemInformationBlockType1-v890-IEs    OPTIONAL
}
```

In order to make the UE know its selected PLMN priority in the shared RAN another IE plmn-PriorityList can be added in SIB1 to indicate the priority of each PLMN sharing the network. In accordance with one embodiment there is a one to one mapping between plmn-IdentityList and plmn-PriorityList and larger value of plmn-PriorityList means higher priority. Other mappings can also be used. For example a lower value of plmn-PriorityList can mean a higher priority. Below an exemplary modified PLMN information broadcasted in SIB1 is shown.

```
SystemInformationBlockType1 ::=   SEQUENCE {
    cellAccessRelatedInfo            SEQUENCE {
        plmn-IdentityList                PLMN-IdentityList,
        plmn-PriorityList                PLMN-PriorityList
        trackingAreaCode                 TrackingAreaCode,
        cellIdentity                     CellIdentity,
        cellBarred                       ENUMERATED {barred, notBarred},
        intraFreqReselection             ENUMERATED {allowed, notAllowed},
        csg-Indication                   BOOLEAN,
        csg-Identity                     CSG-Identity            OPTIONAL    -- Need OR
    },
    cellSelectionInfo                SEQUENCE {
        q-RxLevMin                       Q-RxLevMin,
        q-RxLevMinOffset                 INTEGER (1..8)          OPTIONAL    -- Need OP
    },
    p-Max                            P-Max                       OPTIONAL,   -- Need OP
    freqBandIndicator                INTEGER (1..64),
    schedulingInfoList               SchedulingInfoList,
    tdd-Config                       TDD-Config                  OPTIONAL,   -- Cond TDD
    si-WindowLength                  ENUMERATED {
                                         ms1, ms2, ms5, ms10, ms15, ms20,
                                         ms40},
    systemInfoValueTag               INTEGER (0..31),
    nonCriticalExtension             SystemInformationBlockType1-v890-IEs    OPTIONAL
}
```

When a UE receives the PLMN list and the corresponding priority, it can know the priority it will be treated with in this shared network. It is not necessary for dedicated cells to broadcast priority information and UE can assume that the priority in dedicated cell is the highest.

UE Cell Selection/Reselection

In accordance with some embodiments the following cell selection/cell reselection procedure can be applied in a UE when the UE performs cell selection/reselection. It is to be noted that the below procedures are given as examples and that they can be combined in any suitable combination in a UE.

- If the UE is a delay tolerant UE, e.g., a Machine to Machine (M2M) device, select cell according to radio quality, e.g. RSRP/RSRQ as described in existing specifications.
- If the UE is a delay sensitive UE, i.e. it can initiate delay sensitive service, and it has not camped on a cell
  - If there is only one available cell found by UE, whatever the priority, select that cell to camp on
  - If there are multiple available cells found, the UE selects cell according to priority, i.e. select cell with higher priority first; and for cells with same priority, select cell with better radio quality. For example:
    - If a dedicated cell and shared cell are both available, and in the shared RAN, the UE selected PLMN is with the highest priority, the UE selects the cell with the best radio quality.
    - If dedicated cell and shared cell are both available, and in the shared RAN, the UE selected PLMN is with lower priority, the UE selects the dedicated cell or if multiple dedicated cells are available the dedicated cell with the best radio quality.
    - If only shared cells are available, the UE selects the shared cell in which the UE has the higher priority.
- If the UE is a delay sensitive UE, and it has camped on an dedicated cell
  - If the UE want to initiate delay tolerant service, and there are shared cell available, reselect cell according to radio quality.
- If the UE is a delay sensitive UE, and it has camped on a shared cell
  - The UE can be configured to periodically scan to search whether there is an available cell with higher priority. If so, reselect the cell to camp on;

It is to be noted that the term Dedicated cell as used herein means that the particular cell is owned/operated by one operator only.

Figure 4:
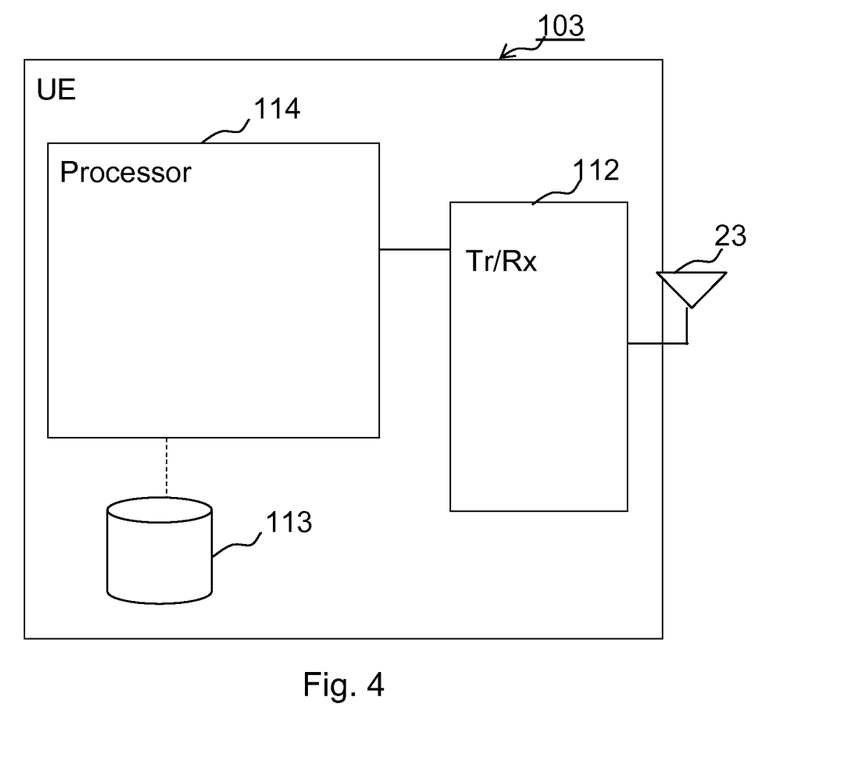
FIG. 4 is a schematic view of a UE.

In FIG. 4 an exemplary User Equipment adapted to follow any of the above procedures is depicted. In particular the UE can be adapted to follow the above procedures for cell selection/cell re-selection. As shown in FIG. 4, the example UE 103 includes a controller/controller circuitry in the form of a processor 114, a memory 113, a transceiver 112, and an antenna 23. In particular embodiments, some or all of the functionality described above as being provided by a UE or other forms of mobile station may be provided by the processor 114 executing instructions stored on a computer-readable medium, such as the memory 113 shown in FIG. 4. Alternative embodiments of the mobile station may include additional components beyond those shown in FIG. 4 that may be responsible for providing certain aspects of the mobile station's functionality, including any of the functionality described above and/or any functionality necessary to support any of the solutions described above.

Figure 5:
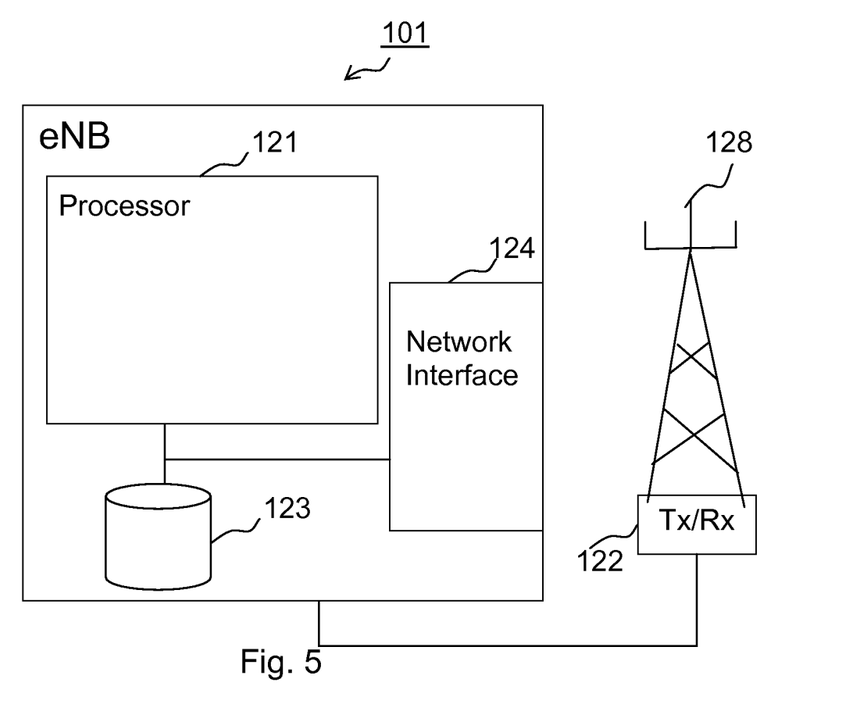
FIG. 5 is a schematic view of a radio base station.

In FIG. 5 an exemplary radio base station eNB 101 is shown. As shown in FIG. 5, the example eNB 101 includes a controller/controller circuitry in the form of a processor 121, a memory 123, a transceiver 122, and an antenna 128. The example eNB can also comprise a network interface 124. In particular embodiments, some or all of the functionality described above as being provided by an eNB, and/or any other type of mobile communications node may be provided by the processor 121 executing instructions stored on a computer-readable medium, such as the memory shown in FIG. 5. Alternative embodiments of the eNB may include additional components responsible for providing additional functionality, including any of the functionality identified above and/or any functionality necessary to support any of the solutions described above.

Using method and devices as described herein can improve performance when Multiple Operator Core Network (MOCN) with shared radio access network (RAN) are available.

This can for example be the case for FCC which allocates 20 MHz in upper 700 MHz to operator FirstNet which is responsible of establishing national public safety broadband networks (NPSBN). In order to improve spectrum efficiency and reduce the cost of NPSBN, FirstNet will coordinate with commercial operators to provide sharing of the network or part of it. In such a set-up FirstNet should have absolute priorities to be served in the shared network in order to guarantee the QoS of public safety service. This means that the QoS of commercial UEs with lower priority cannot be guaranteed in the shared RAN, but the use of the methods and devices as described herein can solve, at least parts, of these problems, and similar problems in other scenarios.

The invention claimed is:

1. A method of cell selection or reselection in a User Equipment (UE), where the UE belongs to a first Public Land Mobile Network (PLMN) and the method comprises:
receiving from a shared cell of a shared radio access network a message indicating a priority of the first PLMN in the shared cell, wherein the shared cell is shared by two or more network operators, including a first network operator associated with the first PLMN, and wherein the indicated priority indicates the priority of the first PLMN in the shared cell in relation to one or more other PLMNs associated with the other network operator or operators sharing the shared cell; and
performing cell selection or reselection as between the shared cell and a dedicated cell of a dedicated radio access network that is associated only with the first PLMN, based at least on comparing the indicated priority of the first PLMN in the shared cell with an assumed higher priority of the first PLMN in the dedicated cell as compared to the shared cell.

2. The method according to claim 1, wherein performing cell selection or reselection as between the shared cell and the dedicated cell comprises selecting the cell having the highest indicated or assumed priority of the first PLMN, and, in case the indicated priority of the first PLMN in the shared cell equals the assumed priority of the first PLMN in the dedicated cell, selecting the cell providing the best radio quality to the UE.

3. The method according to claim 1, wherein the message is a System Information Block (SIB) message.

4. The method according to claim 1, wherein performing cell selection or reselection comprises the UE selecting or reselecting the dedicated cell unless the indicated priority of the first PLMN in the shared cell indicates a highest priority for the first PLMN in the shared cell, as compared to any other PLMN associated with the shared cell, in which case the UE selects or reselects as between the shared and dedicated cells based on radio signal quality.

5. The method according to claim 1, wherein, for initiation of a delay-sensitive service by the UE and where the UE is not currently camped on any cell, performing cell selection or reselection comprises selecting the cell having the highest indicated or assumed priority and, if the indicated priority of the shared cell equals the assumed priority of the dedicated cell, selecting the cell providing the best radio quality to the UE.

6. The method according to claim 1, wherein, performing cell selection or reselection includes initially selecting the dedicated cell for camping, based on the assumed priority of the first PLMN in the dedicated cell being higher than the indicated priority of the first PLMN in the shared cell, and, subsequently, for initiation of a delay-tolerant service by the UE, reselecting to the shared cell if the shared cell provides better radio quality to the UE.

7. A User Equipment (UE) configured to perform cell selection or reselection, where the UE belongs to a first Public Land Mobile Network (PLMN) and comprises controller circuitry configured to:
receive from a shared cell of a shared radio access network a message indicating a priority of the first PLMN in the shared cell, wherein the shared cell is shared by two or more network operators, including a first network operator associated with the first PLMN, and wherein the indicated priority indicates the priority of the first PLMN in the shared cell in relation to one or more other PLMNs associated with the other network operator or operators sharing the shared cell; and
perform cell selection or reselection, as between the shared cell and a dedicated cell of a dedicated radio access network that is associated only with the first PLMN, based at least on comparing the indicated priority of the first PLMN in the shared cell with an assumed higher priority of the first PLMN in the dedicated cell as compared to the shared cell.

8. The UE according to claim 7, wherein said controller circuitry is configured to perform cell selection or reselection as between the shared cell and the dedicated cell by selecting the cell having the highest indicated or assumed priority of the first PLMN, and, in case the indicated priority of the first PLMN in the shared cell equals the assumed priority of the first PLMN in the dedicated cell, selecting the cell providing the best radio quality to the UE.

9. The UE according to claim 7, wherein the message is a System Information Block (SIB) message.

10. The UE according to claim 7, wherein the controller circuitry is configured to perform cell selection or reselection by selecting or reselecting the dedicated cell unless the indicated priority of the first PLMN in the shared cell indicates a highest priority for the first PLMN in the shared cell, as compared to any other PLMN associated with the shared cell, in which case the controller circuitry selects or reselects as between the shared and dedicated cells based on radio signal quality.

11. The UE according to claim 7, wherein, for initiation of a delay-sensitive service by the UE and where the UE is not currently camped on any cell, performing cell selection or reselection comprises selecting the cell having the highest indicated or assumed priority and, if the indicated priority of the shared cell equals the assumed priority of the other cell, selecting the cell providing the best radio quality to the UE.

12. The UE according to claim 7, wherein, the controller circuitry is configured to perform cell selection or reselection by initially selecting the other cell for camping, based on the assumed priority of the first PLMN in the dedicated cell being higher than the indicated priority of the first PLMN in the shared cell, and, subsequently, for initiation of a delay-tolerant service by the UE, reselecting to the shared cell if the shared cell provides better radio quality to the UE.

13. A method performed in a radio base station of a shared radio access network with respect to a shared cell of the shared radio access network, the method comprising:
determining respective priorities of two or more network operators that are sharing the shared cell, each network operator being associated with a different Public Land Mobile Network (PLMN);
broadcasting two or more PLMN identities in the cell, corresponding to the different PLMNs associated with the two or more network operators sharing the shared cell; and
broadcasting priority information indicating respective priorities of the different PLMNs in the shared cell, thereby enabling UEs to make cell selection or reselection decisions with respect to the shared cell based on the priority in the shared cell of the PLMN and a dedicated cell of a dedicated radio access network that is associated only with a first PLMN, of the different PLMNs, to which the UE belongs, based on the priority in the shared cell of the first PLMN and an assumed higher priority of the first PLMN in the dedicated cell as compared to the shared cell.

14. The method according to claim 13, wherein broadcasting the PLMN identities and the priority information comprises broadcasting System Information (SI) for the shared cell.

15. A radio base station for a shared radio access network, the radio base station configured to provide a shared cell of the shared radio access network and comprising controller circuitry configured to:
determine respective priorities of two or more network operators that are sharing the shared cell, each network operator being associated with a different Public Land Mobile Network (PLMN);
broadcast two or more PLMN identities in the cell, corresponding to the different PLMNs associated with the two or more network operators sharing the shared cell; and
broadcast priority information indicating respective priorities of the different PLMNs in the shared cell, thereby enabling UEs to make cell selection or reselection decisions with respect to the shared cell and a dedicated cell of a dedicated radio access network that is associated only with a first PLMN, of the different PLMNs, to which the UE belongs, based on the priority in the shared cell of the first PLMN and an assumed higher priority of the first PLMN in the dedicated cell as compared to the shared cell.

16. The radio base station according to claim 15, wherein the controller circuitry is configured to broadcast the PLMN identities and priority information in System Information (SI) for the shared cell.

\* \* \* \* \*